United States Patent [19]

Decima et al.

[11] Patent Number: 4,880,043
[45] Date of Patent: Nov. 14, 1989

[54] PAIR OF TIRES FOR TWO WHEELED VEHICLE

[75] Inventors: Francois Decima, Clermont-Ferrand; Alain Rochon, Chateaugay, both of France

[73] Assignee: Michelin & Cie (Compagnie Generale des Establissements Michelin), Clermont-Ferrand Cedex, France

[21] Appl. No.: 152,294

[22] Filed: Feb. 4, 1988

[30] Foreign Application Priority Data

Feb. 23, 1987 [FR] France ................. 87 02458

[51] Int. Cl.⁴ ........................... B60C 9/08; B60C 9/22
[52] U.S. Cl. .................... 152/526; 152/454; 152/531; 152/560; 180/219
[58] Field of Search ............. 152/526, 531, 560, 555, 152/535, 209 R, 454; 180/219, 223

[56] References Cited

U.S. PATENT DOCUMENTS 3,980,118  9/1976  Kinas ............................... 152/209 R
4,510,983  4/1985  Ohkuni et al. ..................... 152/526
4,640,329  2/1987  Nakasaki et al. ................ 152/209 R
4,706,724 11/1987  Ohkuni et al. .................. 152/531 X

FOREIGN PATENT DOCUMENTS 1222759  2/1971  United Kingdom .
1438288  6/1976  United Kingdom .
2117330 10/1983  United Kingdom .
2120178 11/1983  United Kingdom .
2128556  5/1984  United Kingdom .

Primary Examiner—Raymond Hoch
Attorney, Agent, or Firm—Oblon, Spivak, McClelland, Maier & Neustadt

[57] ABSTRACT

To provide good handling behavior for a motorcycle, the belt of the rear motorcycle tire has threads extending parallel to the equatorial plane and the slip angles of the tires as a function of the camber (slip angle δ as a function of camber angle γ) are such that the difference: front slip angle δ2 minus rear slip angle δ1 as a function of camber angle γ is an invariably increasing function of γ.

3 Claims, 2 Drawing Sheets

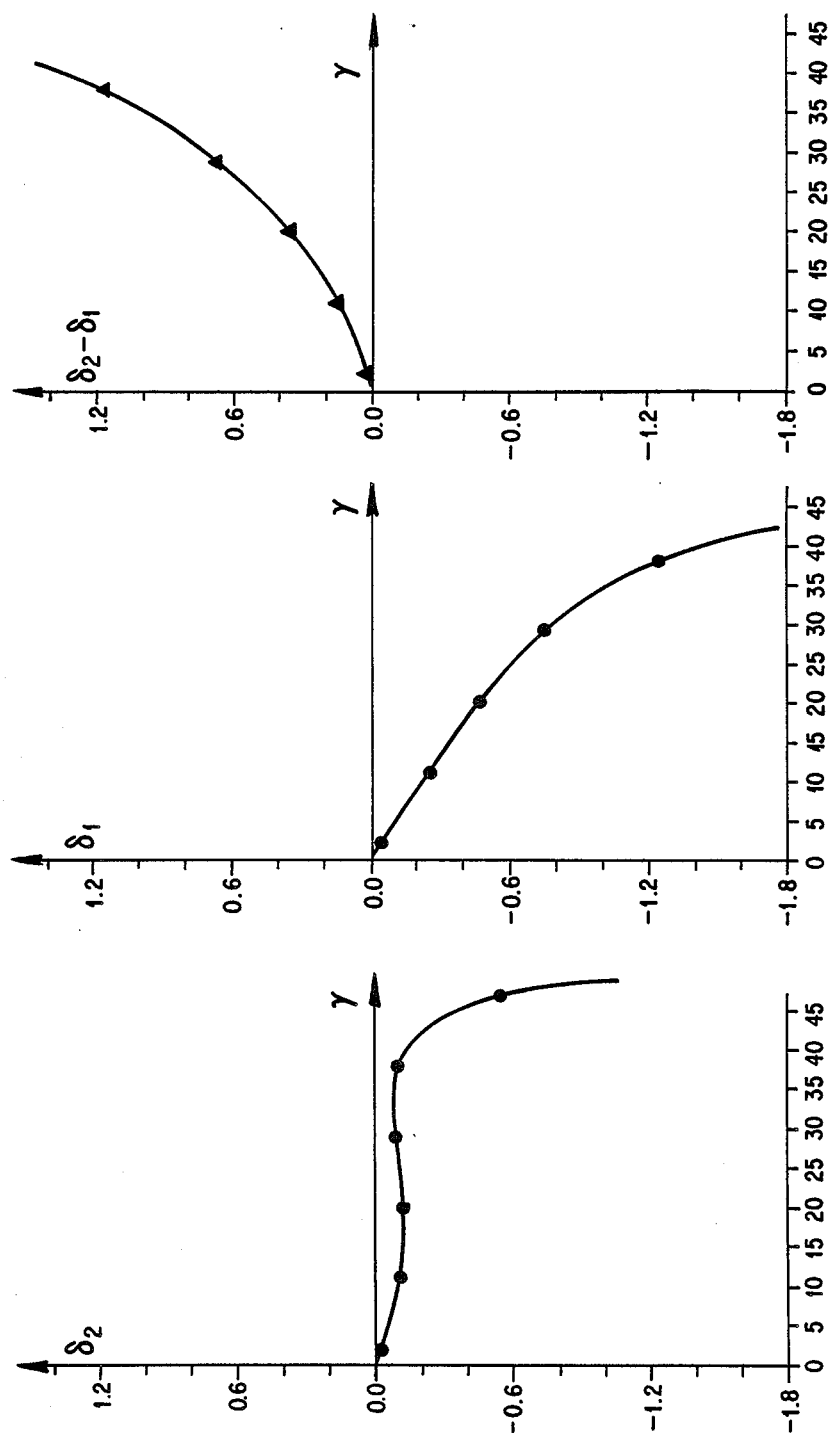

PAIR OF TIRES FOR TWO WHEELED VEHICLE

BACKGROUND OF THE INVENTION

1. Field of the Invention

This invention relates to radial ply tires designed to be mounted on motorcycles.

2. Discussion of the Related Art

The functioning of tires mounted on motorcycles, and more generally on any vehicles with two wheels placed one in front of the other (mopeds, motorcycles), is entirely different from that of tires mounted on automobiles, trucks, trailers, etc. For example, the tires of the first category are subject to a very wide range of so-called camber angles while those of the second category are used only in configurations where the camber angle is almost zero, or at least very small.

To keep a vehicle on its path, the tires must develop cross thrusts. In tires of the first category, these thrusts are mainly so-called camber thrusts (because they are induced by a camber angle) whereas in tires of the second category, these thrusts are mainly so-called slip thrusts (because they are induced by the slip angle that the tire tread makes in relation to the vehicle path).

When it was desired to design radial ply tires for motorcycles, not all of the advantages pertaining to this design, encountered in its other applications, were found to exist. This appears to be due to the fact that the thrusts of a radial ply tire develop in a way totally different from what happens for a so-called bias tire. In particular, the part of the tire thrust due to camber thrusts in a radial ply tire is very small. A degraded behavior results, i.e., a deteriorated ability of the motorcycle to follow the path imposed by the driver. Moreover, instabilities in straight line travel are frequently observed: the motorcycle oscillates around the desired rectilinear path.

Attempts have already been made to remedy this problem by providing coordinated tire structures for the front and rear tires. U.S. Pat. No. 4,510,983 provides a relation for linking the angles of the tread reinforcement threads for the front tire and the rear tire. This proposal, however, proved unable to impart a good handling behavior, regardless of the use and/or the other components of the tires.

SUMMARY OF THE INVENTION

An object of this invention is to provide a pair of tires for a motorcycle which can impart handling behavior of a greatly improved quality to said motorcycle.

Another object of the invention is to be able to provide such a pair of tires capable of imparting good handling behavior without being dependent on the characteristics of the motorcycle from the viewpoint of its suspension and the rigidity of its frame.

Yet another object of this invention is to provide such a pair of tires whose behavior does not decline with wear.

The pair of tires according to the invention, which are both radial ply and belted, are intended to constitute the tires mounted on a motorcycle, the rear tire being provided with at least one belt comprising reinforcement threads oriented approximately parallel to the equatorial plane of said tire and placed in the median zone of said tire. The rear tire provides a slip angle $\delta_1$ as a function of given camber angle $\gamma$, and the front tire provides a slip angle $\delta_2$ as a function of camber angle $\gamma$, such that the difference $\delta_2 - \delta_1$ is an invariably increasing function of $\gamma$.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein:

FIG. 2 illustrates tire slip angle $\delta_2$ as a function of camber angle $\gamma$ for a front tire;

FIG. 3 illustrates tire slip angle $\delta_1$ as a function of camber angle $\gamma$ for a rear tire; and FIG. 4 illustrates the difference $\delta_2 - \delta_1$ as a function of camber angle $\gamma$ for a pair of tires according to the invention.

DETAILED DESCRIPTION OF THE PREFERRED EMBODIMENTS

Figure 1:
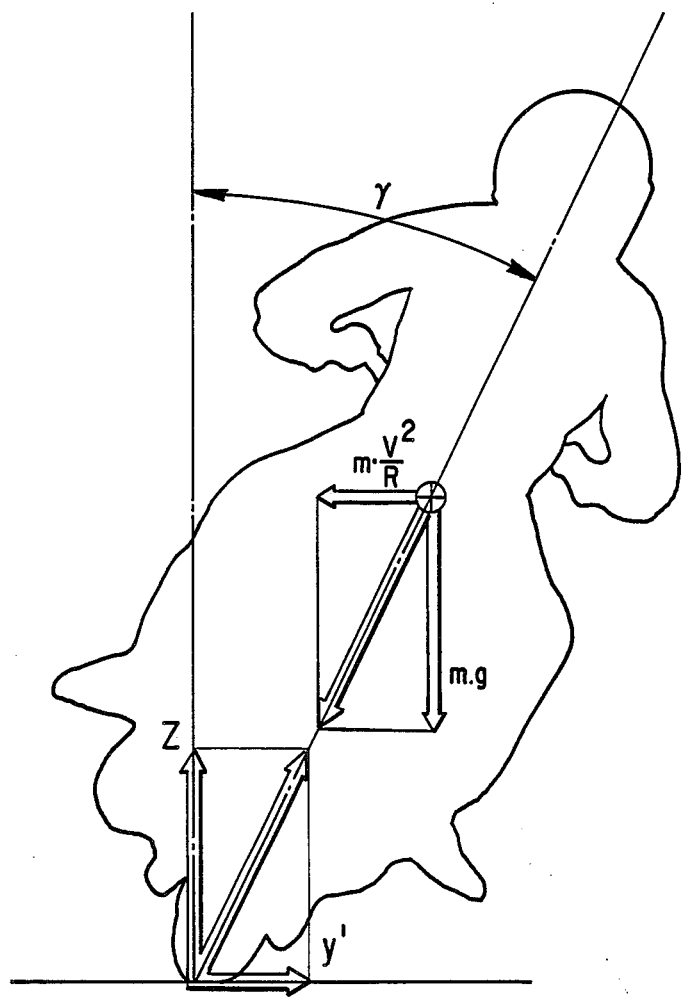
FIG. 1 schematically represents the angles and the forces to be considered when a motorcycle takes a turn.

As can be seen in FIG. 1, a two-wheeled vehicle of the motorcycle type is in equilibrium when the resultant of the forces applied at the center of gravity goes through the line connecting the contact points of the tires with the ground. An equilibrium condition can be observed in turning, under the effect of centrifugal force, whose modulus is equal to $$\frac{m V^2}{R},$$

only if the motorcycle and rider with a mass m assume a determined camber inclination $\gamma$. Consequently, the tire is subjected to a camber angle $\gamma$ imposed by the speed V of the motorcycle and the turning radius R. In another connection, the tire must develop a cross thrust $y'$ parallel to the centrifugal force and of equal amplitude.

Because the necessary cross thrust $y'$ does not necessarily correspond to the resultant camber thrust resulting from the camber angle $\gamma$, it is achieved by a combination of so-called camber and slip thrusts. For reference, the slip thrust is defined as being that which a tire develops under a determined load Z at a zero camber angle $\gamma$ and the camber thrust as being that which a tire develops under a determined load Z and for a zero slip angle $\delta$.

Therefore, each tire can be characterized by a function curve providing slip angle $\delta$ as a function of camber angle $\gamma$ (without drive torque and at continuous speed).

In the course of the description, the following conventions will be used: camber angle $\gamma$ is positive for a right turn and slip angle $\delta$ is positive when in a right turn, the tire itself steers to the left in relation to the path defined by the curve that is constantly tangential to the speed vector.

Plotting of the curve giving slip angle $\delta$ as a function of camber angle $\gamma$ can be done very simply in the manner explained below. The tire is set in rotation on a test machine of the "flywheel roller" type while imposing thereon a speed of rotation corresponding to a linear speed V, and vertical load Z. For each value of camber angle $\gamma$, thrust $y'$ parallel to the axis of rotation of the flywheel on which the tire is in rotation is plotted. This thrust y' generally does not correspond to the centrifugal force which must be compensated. Now, it has been seen above that camber angle δ is provided to compensate for the centrifugal force (at a given load). Therefore, the theoretical value y'th corresponding to each angle under consideration can be calculated. It is then possible to adjust slip angle δ so that measured thrust y'm corresponds to theoretical value y'th. Thus, there is obtained a plotting that characterizes a tire by a simple measurement based upon the actual behavior of the tire. It has been found that this characterization varies only very slightly with the speed, the load and the pressure. For this reason, it is used to provide a simple way of predicting the behavior of the tires.

It is known that the thrust potential of a tire has a limit, which is the limit of adherence: at given camber and slip, the maximum lateral thrust permitted depends on the drive torque or braking applied. Therefore, if the conditions of speed and radius are given, a camber angle γ is imposed and the slip angle δ will be a measurable property of the tire as explained above. If a drive force is added, the drive will increase to maintain the same lateral thrust. Since the slip then increases, the slide increases and therefore the wear also. Wear, therefore, is a concern especially for the rear tire, which is typically the driven tire, i.e., the tire subject to almost continuously transmitted engine drive torque. The invention therefore proposes to place at the rear a radial ply tire whose belt comprises reinforcement threads with a high modulus of elasticity such as, for example, steel, fiber glass or aramid, oriented approximately parallel to the equatorial plane of said tire, and placed in the median zone of the tire, i.e., under the part of the tire tread in contact with the road at low camber angles. By reinforcement thread is meant both unit threads and cords. Since the belt assures an effective binding of the carcass, it imparts to it a very good resistance to distortions due to centrifuging. The rubber, being only very slightly pulled by the centrifuging, in the best possible condition to resist wear due to the drive torque. Thanks to this type of reinforcement, the tire therefore resists wear very well in a straight line. On the other hand, since the slip resistance of such a tire is very slight, as is well known, it resists wear less well in turns, where wear occurs in the shoulder parts of the tire tread due to high camber angles. Since any tire is caused to roll much more often in a straight line than in a turn, this structure very advantageously imparts a very even wear. Consequently, the response of such a tire to cross stresses practically does not change when it is used.

To assure a good behavior, the front tire and the rear tire of the motorcycle cannot be chosen independently. It has been proposed that the angles of the threads of the belt of the front tire and the angles of the threads of the belt of the rear tire comply with a given relation. However, it has been observed that this does not always make it possible to obtain handling behavior of good quality. This is due to the fact that numerous parameters influence this behavior and even if it is possible to foresee the influence of some, it is difficult to foresee the overall behavior. For this reason, the invention proposes a method making it possible to choose a pair of tires from a measurement made independently on each of them, making it possible to take into account their actual characteristics.

In FIGS. 2 and 3, slip angle curves δ are plotted as a function of camber angle γ for each of the tires as explained above: the function curve $\delta 1 = f(\gamma)$ is for the rear tire and $\delta 2 = f(\gamma)$ is for the front tire.

Strictly speaking, the camber angle of the front tire varies very slightly as a function of the steering lock angle since the front wheel of a motorcycle always has a large caster angle. However, the steering lock angle is always very small. Consequently, this variation is always very slight (as can be very easily demonstrated by establishing the trigonometric relation linking the camber, steering lock, and caster angles) and it can be considered that the camber angle is identical for the front tire and for the rear tire.

Preferably, tires are used for which the ratio between the height and width of the tire is between 0.55 and 0.70.

With one of the two tires being selected, it is necessary to choose the other tire so that the difference $\delta 2 - \delta 1$ is an invariably increasing function of γ. With the proposed structure for the rear tire (belt with threads parallel to the equatorial plane, i.e., zero degree), it is observed in FIG. 3 that the camber thrust is very insufficient to compensate for the centrifugal force. By adopting for the front tire a belt whose reinforcement threads are oriented symmetrically in relation to the equatorial plane, a tire is very easily obtained whose camber thrust almost compensates for the centrifugal force over a wide range of values of camber angle γ. This is observed in FIG. 2 for a tire whose characteristics are detailed below.

A pair of tires complying with the relation set forth is as follows:

Rear tire 160/60 VR 16:
1 rayon body ply,
1 zero degree tread belt of "Kevlar" (registered trademark of Dupont de Nemours), extending over at least 85% of the width of the tire.

Front tire 130/60 VR 16:
1 rayon body ply,
2 25° tread belts of "Kevlar," extending over at least 85% of the width of the tire.

FIG. 4 gives the resulting value of $\delta 2 - \delta 1$ as a function of γ. All of the figures, of course, are symmetrical in relation to the original for symmetrical tires.

Obviously, numerous modifications and variations of the present invention are possible in light of the above teachings. It is therefore to be understood that within the scope of the appended claims, the invention may be practiced otherwise than as specifically described herein.

What is claimed as now and desired to be secured by Letters Patent of the United States is:

1. A pair of radial ply tires respectively mounted on the front and rear wheels of a motorcycle, comprising:
   a rear tire including at least one belt having reinforcement threads oriented approximately parallel to an equatorial plane of said tire and positioned in a median zone of said rear tire, said rear tire having a slip angle δ1 as a given function of a camber angle γ, and
   a front tire having a slip angle δ2 as a given function of a camber angle γ,
   wherein the magnitude of difference $\delta 2 - \delta 1$ increases with an increase in the magnitude of γ.

2. The pair of tires according to claim 1 wherein said front tire includes one belt having at least two plies of reinforcement threads oriented symmetrically in relation to the equatorial plane of said front tire.

3. The pair of tires according to claim 4 wherein a ratio of the height of each of said front and rear tires to the width thereof is between 0.55 and 0.70.

* * * * *